US010109026B2

(12) United States Patent
Garrett et al.

(10) Patent No.: US 10,109,026 B2
(45) Date of Patent: Oct. 23, 2018

(54) MOBILE RESTAURANT ORDERING SYSTEM

(75) Inventors: James M. Garrett, Suwanee, GA (US); Ryan Connelly, Atlanta, GA (US)

(73) Assignee: Tillster, Inc., Los Angeles, CA (US)

(*) Notice: Subject to any disclaimer, the term of this patent is extended or adjusted under 35 U.S.C. 154(b) by 0 days.

(21) Appl. No.: 13/212,905

(22) Filed: Aug. 18, 2011

(65) Prior Publication Data

US 2012/0209730 A1 Aug. 16, 2012

Related U.S. Application Data

(60) Provisional application No. 61/390,607, filed on Oct. 6, 2010.

(51) Int. Cl.
*G06Q 30/06* (2012.01)
*G06Q 50/12* (2012.01)

(52) U.S. Cl.
CPC ............. *G06Q 50/12* (2013.01); *G06Q 30/06* (2013.01)

(58) Field of Classification Search
CPC .... G06Q 50/12; G06Q 30/06; G06Q 30/0623; G06Q 30/00
USPC .......... 705/15, 27, 14.27; 709/204; 370/338; 455/421, 456.3; 235/322; 340/5.9, 5.42, 340/5.72
See application file for complete search history.

(56) References Cited

U.S. PATENT DOCUMENTS

| | | | |
|---|---|---|---|
| 4,114,601 A | 9/1978 | Abels | |
| 5,190,059 A | 3/1993 | Fabian et al. | |
| 5,931,824 A | 8/1999 | Stewart et al. | |
| 6,026,375 A * | 2/2000 | Hall | G06Q 10/08 701/533 |
| 6,076,007 A | 6/2000 | England et al. | |
| 6,366,206 B1 | 4/2002 | Ishikawa et al. | |
| 6,400,272 B1 | 6/2002 | Holtzman et al. | |
| 6,424,262 B2 | 7/2002 | Garber et al. | |
| 6,473,739 B1 | 10/2002 | Showghi et al. | |
| 6,574,603 B1 | 6/2003 | Dickson et al. | |
| 6,600,418 B2 | 7/2003 | Francis et al. | |
| 6,640,214 B1 | 10/2003 | Nambudiri et al. | |
| 6,669,089 B2 | 12/2003 | Cybulski et al. | |
| 6,768,419 B2 | 7/2004 | Garber et al. | |
| 6,809,645 B1 | 10/2004 | Mason | |
| 6,861,954 B2 | 3/2005 | Levin | |

(Continued)

OTHER PUBLICATIONS

Garret, James M.; Non-Final Office Action for U.S. Appl. No. 14/274,416, filed May 9, 2014, dated Aug. 11, 2014, 13 pgs.

(Continued)

*Primary Examiner* — Vanel Frenel
(74) *Attorney, Agent, or Firm* — Taylor English Duma LLP

(57) ABSTRACT

A mobile ordering system for a restaurant configured to request processing of an order made by a customer with a mobile device when the customer enters a predetermined geographic region associated with the restaurant as determined by a server configured to process global positioning satellite ("GPS") data received from the mobile device. A user associated with the restaurant uses the mobile restaurant ordering system to define the predetermined geographic region. The server may be configured to dynamically alter the predefined geographic region associated with the restaurant based on certain factors associated with the restaurant, the order, and/or the customer.

20 Claims, 2 Drawing Sheets

(56) References Cited

U.S. PATENT DOCUMENTS

| | | | |
|---|---|---|---|
| 6,865,261 B1* | 3/2005 | Rao | G06F 3/023 379/90.01 |
| 6,900,731 B2 | 5/2005 | Kreiner et al. | |
| 7,019,650 B2 | 3/2006 | Volpi et al. | |
| 7,110,964 B2* | 9/2006 | Tengler | G06Q 10/087 705/15 |
| 7,142,118 B2 | 11/2006 | Hamilton et al. | |
| 7,287,002 B1 | 10/2007 | Asher et al. | |
| 7,307,530 B2 | 12/2007 | Fabian et al. | |
| 7,557,710 B2 | 7/2009 | Sanchez et al. | |
| 7,848,765 B2* | 12/2010 | Phillips | G08B 21/0236 455/404.2 |
| 7,953,873 B1* | 5/2011 | Madurzak | G06Q 30/02 705/15 |
| 8,204,757 B2 | 6/2012 | Carlson et al. | |
| 8,498,900 B1* | 7/2013 | Spirin et al. | 705/15 |
| 8,624,727 B2* | 1/2014 | Saigh | H04W 4/025 340/539.1 |
| 8,706,542 B2 | 4/2014 | O'Meara et al. | |
| 8,762,208 B2* | 6/2014 | Hutcherson | 705/15 |
| 9,129,289 B2 | 9/2015 | Vaughn et al. | |
| 2002/0026364 A1* | 2/2002 | Mayer et al. | 705/15 |
| 2002/0067263 A1 | 6/2002 | Tafoya et al. | |
| 2002/0138350 A1* | 9/2002 | Cogen | 705/15 |
| 2002/0143320 A1 | 10/2002 | Levin | |
| 2002/0143655 A1 | 10/2002 | Elston et al. | |
| 2003/0001776 A1 | 1/2003 | Hannah et al. | |
| 2003/0066537 A1 | 4/2003 | Fabian et al. | |
| 2003/0105394 A1 | 6/2003 | Fabian et al. | |
| 2003/0195818 A1* | 10/2003 | Howell | G06Q 30/06 705/26.8 |
| 2003/0208409 A1* | 11/2003 | Mault | 705/26 |
| 2004/0054592 A1* | 3/2004 | Hernblad | 705/15 |
| 2004/0084525 A1 | 5/2004 | Kreiner et al. | |
| 2004/0129279 A1 | 7/2004 | Fabian et al. | |
| 2004/0201479 A1 | 10/2004 | Garber et al. | |
| 2004/0210621 A1 | 10/2004 | Antonellis | |
| 2004/0250819 A1 | 12/2004 | Blair et al. | |
| 2005/0004843 A1* | 1/2005 | Heflin | G06Q 50/12 705/15 |
| 2005/0049922 A1* | 3/2005 | Kargman | G06Q 50/12 705/15 |
| 2006/0047835 A1* | 3/2006 | Greaux | 709/229 |
| 2006/0085265 A1* | 4/2006 | Dietz | G06Q 30/02 705/15 |
| 2006/0218040 A1* | 9/2006 | Sabapathypillai | 705/15 |
| 2007/0053306 A1 | 3/2007 | Stevens | |
| 2007/0055785 A1 | 3/2007 | Stevens | |
| 2007/0088624 A1* | 4/2007 | Vaughn et al. | 705/26 |
| 2007/0093709 A1 | 4/2007 | Abernathie | |
| 2007/0290030 A1 | 12/2007 | Fox et al. | |
| 2008/0222004 A1* | 9/2008 | Pollock | G06Q 30/0603 705/15 |
| 2008/0249898 A1 | 10/2008 | Ratnakar | |
| 2009/0099972 A1* | 4/2009 | Angert et al. | 705/80 |
| 2009/0106124 A1* | 4/2009 | Yang | G06Q 10/08 705/26.1 |
| 2009/0182630 A1* | 7/2009 | Otto et al. | 705/14 |
| 2009/0187488 A1* | 7/2009 | Shamilian | G06Q 10/02 705/16 |
| 2009/0228325 A1 | 9/2009 | Simmons | |
| 2009/0229325 A1* | 9/2009 | Cymbal | B60R 25/02107 70/189 |
| 2009/0281903 A1* | 11/2009 | Blatstein | 705/15 |
| 2009/0313138 A1 | 12/2009 | Ratnakar | |
| 2010/0076853 A1* | 3/2010 | Schwarz | G06Q 20/12 705/15 |
| 2010/0161432 A1* | 6/2010 | Kumanov et al. | 705/15 |
| 2010/0280895 A1 | 11/2010 | Mottola | 705/14.24 |
| 2011/0040655 A1* | 2/2011 | Hendrickson | 705/27.1 |
| 2011/0191207 A1* | 8/2011 | Schueller | G06Q 30/0639 705/26.9 |
| 2011/0258058 A1* | 10/2011 | Carroll et al. | 705/15 |
| 2011/0270662 A1* | 11/2011 | Rocco | 705/14.27 |
| 2012/0059741 A1* | 3/2012 | Khan | G06Q 30/06 705/27.1 |
| 2013/0110385 A1 | 5/2013 | Heed et al. | |
| 2013/0110393 A1 | 5/2013 | Heed | |
| 2013/0191173 A1* | 7/2013 | Shobola | 705/5 |
| 2013/0211814 A1* | 8/2013 | Derks et al. | 704/2 |
| 2014/0006310 A1* | 1/2014 | Hamilton, II | G06Q 30/02 705/347 |

OTHER PUBLICATIONS

Garrett, James M.; U.S. Patent Application entitled: Customer Interface Restaurant System, having U.S. Appl. No. 14/274,416, filed May 9, 2014, 27 pgs.
Garrett, James M.; U.S. Provisional Application Entitled: Timely, Proximity-Based Mobile Restaurant Ordering System under U.S. Appl. No. 61/390,607, filed Oct. 6, 2010; 18 pgs.
Garrett, James M.; Advisory Action for U.S. Appl. No. 14/274,416, filed May 9, 2014, dated May 18, 2015, 3 pgs.
Garrett, James M.; Final Office Action for U.S. Appl. No. 14/274,416, filed May 9, 2014, dated Mar. 10, 2015, 15 pgs.
Garrett, James M.; Non-Final Office Action for U.S. Appl. No. 14/274,416, filed May 9, 2014, dated Oct. 1, 2015, 15 pgs.
Garrett, James M.; Applicant Interview Summary for U.S. Appl. No. 14/274,416, filed May 9, 2014, dated Aug. 19, 2015, 3 pgs.
Garrett, James M.; Non-Final Office Action for U.S. Appl. No. 14/274,416, filed May 9, 2014, dated Jun. 30, 2015, 14 pgs.
Garrett, James M.; Applicant Initiated Interview Summary for U.S. Appl. No. 14/274,416, filed May 9, 2014, dated Mar. 17, 2016, 3 pgs.
Garrett, James M.; Non-Final Office Action for U.S. Appl. No. 14/274,416, filed May 9, 2014, dated Feb. 9, 2016, 18 pgs.
Garrett, James M.; Final Office Action for U.S. Appl. No. 14/274,416, filed May 9, 2014, dated Dec. 27, 2017, 28 pgs.
Garrett, James M.; Non-Final Office Action for U.S. Appl. No. 14/274,416, filed May 9, 2014, dated Jun. 12, 2017, 22 pgs.

* cited by examiner

MOBILE RESTAURANT ORDERING SYSTEM

CROSS REFERENCE TO RELATED APPLICATIONS

The present application claims the benefit of U.S. patent application No. 61/390,607, filed on Oct. 6, 2010, the entire disclosure of which is hereby incorporated by reference as if set forth verbatim herein and relied upon for all purposes.

FIELD OF THE INVENTION

The present invention relates to restaurant ordering systems and, more specifically, to a proximity-based, mobile restaurant ordering system.

BACKGROUND OF THE INVENTION

A quick serve restaurant (or "QSR") is a restaurant that prepares food items in advance, keeping components separate and warm or cool. Upon customer arrival, the restaurant finishes and packages products within a relatively small amount of time. There is an important time window after the final packaging of the product before the food quality deteriorates. For this reason, restaurants generally only package food for customers once they have arrived and ordered. During peak hours, long lines for a restaurant may discourage customers from visiting or ordering from the restaurant. This can create a poor customer experience for those in line and a loss of revenue derived from individuals who choose another option to avoid the wait. Even if a customer is presented with the option to place an order in advance of visiting the restaurant, determining when to package the food for a customer, however, is difficult without a timely notification from the customer.

SUMMARY OF THE INVENTION

The present invention recognizes and addresses the foregoing considerations, and others, of prior art construction and methods.

In this regard, one embodiment of the present invention provides a method for processing an order for a retail establishment having at least one store, where a server is associated with the retail establishment. The method includes the steps of providing at a user mobile device an application that includes a list of at least one item available for purchase from the store, receiving at the server from the user mobile device a selection of the at least one item for purchase from the retail establishment at the store, establishing a geographic region based on a physical location of the store, determining whether the user mobile device is within the geographic region based on data received from the user mobile device at the server representative of a location of the user mobile device, and preparing the at least one item for presentation at the store when the user mobile device is within the geographic region.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
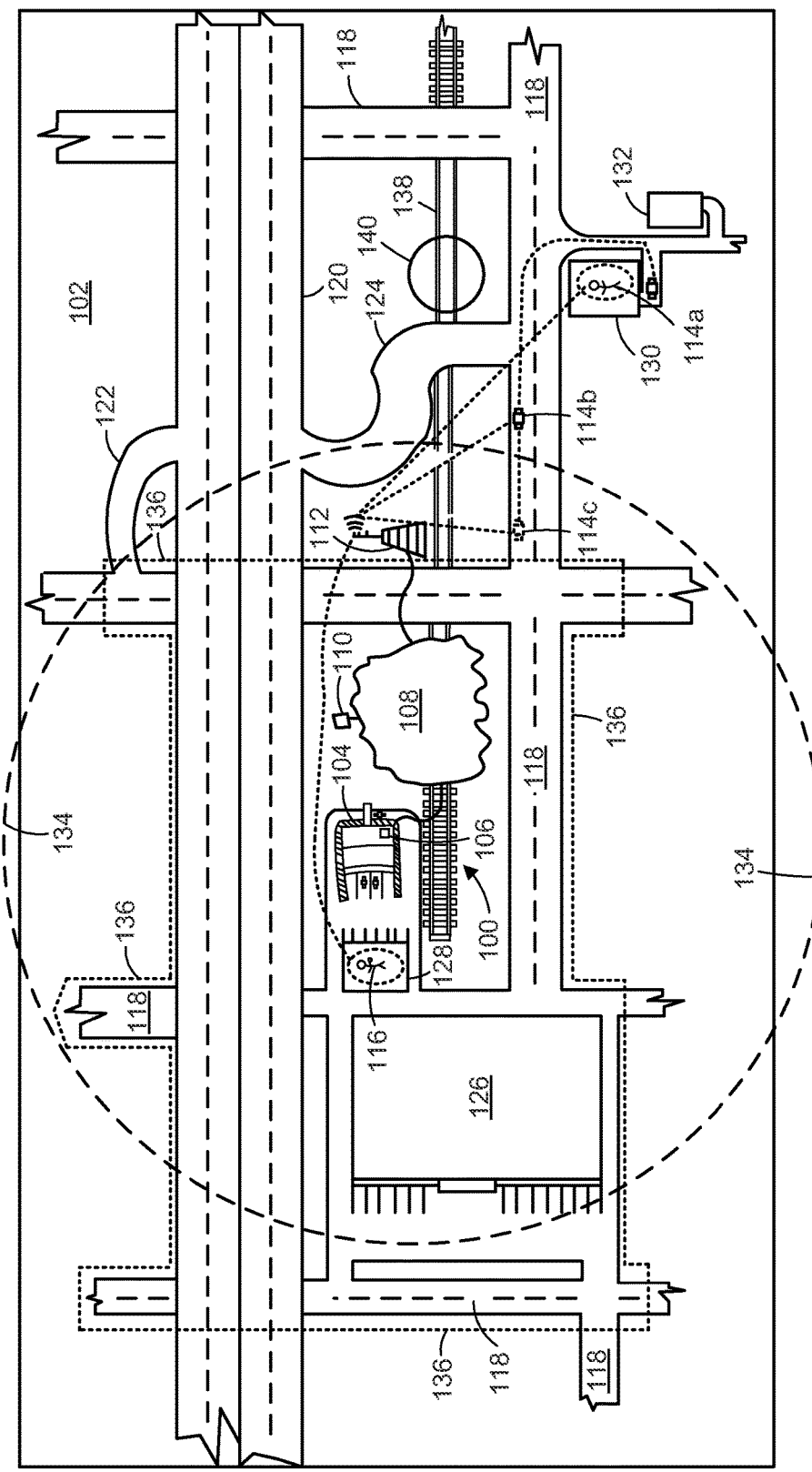
FIG. 1 is a partially schematic, overhead view of a mobile restaurant ordering system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 is a schematic representation of a mobile restaurant ordering system 100 superimposed on an overhead view of a geographic region 102. Geographic region 102 includes a restaurant 104, while system 100 comprises one or more computing or processing devices included within the restaurant, such as a point-of-sale system ("POS") 106, operatively connected to a wide area network ("WAN") 108, such as the Internet. It should be understood that restaurant 104 may include additional personal computers or servers operatively connected to POS 106 and/or WAN 108. For instance, restaurant 104 may comprise a number of ordering stations or kiosks that allow cashiers, servers, or customers to place orders for products offered by the restaurant, as should be understood by those skilled in the art.

Other computing devices, such as a server 110 and a maps service, are also operatively connected to WAN 108. The maps service may be any system configured to output geographic information based on inputs provided to the service via an application programming interface ("API"). In a preferred embodiment, for example, the maps service is the GOOGLE MAPS service provided by Google Inc. of Mountain View, Calif. It should be understood, however, that other maps services that provide a suitable API to communicate with the service may be used, such as the BING MAPS service offered by the Microsoft Corporation of Redmond, Wash. Thus, it should be understood that maps service is typically a cloud-based software-as-a-service (or "SAS") system comprising multiple computing devices and memory. The function, operation, and interaction of server 110 and the maps service are described in more detail below with respect to FIGS. 1 and 2.

Geographic area 102 includes one or more cellular towers 112, such as those maintained by wireless telephone carriers, operatively connected to WAN 108. As should also be understood in the art, cellular towers 112 are configured to communicate with mobile devices 114 and 116, such as cellular telephones. Each of mobile devices 114 and 116 comprises a processing device and memory operatively connected to the respective processing device. Likewise, each of POS 106 and server 110 also comprises a processing device and memory operatively connected to the processing device. It should be understood, however, that server 110 may be a virtual, cloud-based, and/or SAS system similar to the maps service as described above that comprises multiple servers, computers, and/or other computing devices.

In the presently-described embodiment, mobile devices 114 and 116 may be any mobile device configured to output or transmit global positioning satellite ("GPS") location updates and may, therefore, be a cellular phone, music player, tablet computer, mobile gaming system, laptop, etc. For example, mobile devices comprising, and configured to execute, version 4 or greater of the iOS operating system developed by Apple Inc. of Cupertino, Calif., such as the IPHONE 4 or IPAD 2 offered by Apple Inc. are suitable for use with the present invention (referred to herein as "iOS devices"). However, any other mobile device configured to transmit GPS location updates, such as mobile devices comprising, and configured to execute, version 2 or greater of the Android operating system developed by Google Inc., such as the devices offered by the HTC Corporation of Taiyuan, Taiwan under the HTC brand, are also suitable devices (referred to herein as "Android devices"). Nonetheless, it should be understood that any device configured to transmit GPS location updates may be used as mobile devices 114 and 116 without departing from the scope of the present invention. Those skilled in the art should appreciate that mobile devices 114 and 116 are configured to transmit data via cellular tower 112 and/or WAN 108.

It should be understood that the GPS system of mobile devices 112 and 114 may be configured to utilize assisted GPS ("aGPS"). Those skilled in the art should understand that aGPS is a system that improves the startup or time-to-first-fix ("TTFF") of a GPS system. While conventional GPS systems use radio signals from satellites only, aGPS additionally uses network resources to locate and use the satellites in a faster and more efficient manner, as well as during conditions when the signal between the satellites and the mobile device are weak. In a scenario where mobile devices 112 and 114 are configured to use aGPS, the mobile devices transmit an accuracy measurement when the mobile devices transmit GPS information. The accuracy measurement typically corresponds to a measurement by which the actual location of the mobile device may deviate. In an embodiment where mobile devices 112 and 114 use aGPS and therefore output an accuracy measurement with GPS information, system 100 may be configured to use the accuracy measurement, for instance, in the manner described in more detail below. aGPS systems should be understood by those skilled in the art and are therefore not described in more detail herein. It should also be understood that the GPS data and coordinates referred to in the ensuing explanation are intended to include the data and coordinates provided by both conventional GPS and aGPS systems.

It should also be understood that mobile devices 114 and 116 are configured to download, store, and execute mobile or web applications. The mobile applications may be provided by an online service, such as the APP STORE maintained by Apple Inc. for iOS devices or the ANDROID MARKET maintained by Google Inc. for Android devices. It should be understood that both Apple Inc. and Google Inc. provide software development kits ("SDKs") that facilitate the creation of mobile applications for iOS devices and Android devices, respectively. That is, the SDKs provide development tools that allow developers to create mobile applications, as well as instructions that explain the manner by which the mobile applications may interact with components of the mobile device, such as the device's GPS or aGPS system. The SDKs and their use for iOS and Android devices, respectively, should be understood by those skilled in the art and are therefore not described in further detail.

The processing devices within POS 106, server 110, mobile devices 114 and 116, and any other computer, server, or any other computing device within system 100, including within restaurant 104, may be a processor, microprocessor, controller, microcontroller, other appropriate circuitry, or any combination thereof. For example, multiple electronic devices configured to operate together within each computing device may be considered a "processing device." The memory in each computing device may be any type of memory or computer-readable medium that is capable of being accessed by the respective processing device. For instance, the memory may be random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Each processing device may also include a portion of memory accessible only to the processing device, commonly referred to as "cache." Thus, the memory may be part of the respective processing device, may be separate, or may be split between the relevant processing device and one or more separate memory devices.

Each memory comprises computer-executable program code or instructions that, when executed by the respective processing device, perform at least a portion of the processes described in more detail below. Each memory may also comprise one or more data structures for storing information, such as a database or a table. The computer-executable program code or instructions in this scenario, as should be known to those skilled in the art, usually include one or more application programs, other program modules, program data, firmware, and/or an operating system.

In one embodiment, POS 106 is configured to communicate via an API with resources external to restaurant 104, such as server 110. The API is typically installed on and executed by POS 106, although it should be understood that the API may be installed on and executed by another computer or server located within restaurant 104. Examples of POS systems that include an API configured to handle communications with external systems include the COMPRIS POS Solution offered by NCR Corporation of Duluth, Ga., the POS systems offered by Radiant Systems, Inc. of Alpharetta, Ga., including the ALOHA system, the POS systems offered by Micros Systems, Inc. of Columbia, Md., including the MICROS PCWS system, and the POS systems offered by Restaurant Data Concepts, Inc. of Warwick, R.I., doing business as POSitouch. It should be understood that the API for POS 106 defines the manner by which an external resource may request POS 106 to process an order, as described below. For instance, the API defines the format, syntax, and data elements required by POS 106 in order to carry out an order. The API may define, for example, that POS 106 requires a unique identification ("id") for each product of an order, as well as information sufficient to effect payment for the order. It should be understood, however, that additional information may be required to process an order depending on the specific API and POS system employed by restaurant 104. For instance, POS 106 may also require a "modifier" for each product in an order, as described in more detail below. Regardless of the particular format, once the data required to process an order is provided to POS 106 via the API, the POS carries out the order in a manner similar to that as if the order was provided to the POS from within restaurant 104, such as via an ordering station or kiosk as described above. POS systems and the related APIs that are configured to allow external systems to communicate with the POS systems should be understood by those skilled in the art and are therefore not described in further detail.

In one embodiment, server 110 communicates with the API of POS 106 via a software application referred to as a POS bridge. The POS bridge may be installed on and executed by POS 106 or by another computer or server located within restaurant 104 that is operatively configured to communicate with the POS via the API and with server 110. The POS bridge is configured to provide data representative of the products offered by restaurant 104 from the API to server 110 and to provide data representative of an order received from the server to the API in a manner sufficient to effect the order. The POS bridge operates to allow server 110 to transmit a request to POS 106, which the POS bridge translates into a request understood by the POS's API, regardless of the specific POS system employed by restaurant 104. In other words, the POS bridge is configured to communicate with both the POS's API and server 110 so that the API and server are not required to communicate in the format or syntax understood by the other. This may be accomplished by a developer who analyzes the programming language, syntax, and format that server 110 uses both to receive information about products offered by restaurant 104 and to transmit a request to the restaurant to process an order. The developer also analyzes the programming language, syntax, and format that the specific API of POS 106 uses both to output the product information and to receive the order request. The developer then designs and programs the POS bridge to translate any material received from the API into the format and syntax expected by server 110 and vice versa. Those skilled in the art should appreciate that this allows server 110 to communicate with various different POS systems without modifying the server or the POS. For instance, should POS 106 be replaced with a different POS system (or should server 110 be configured to communicate with different POS systems of multiple restaurants), the POS bridge is (re)programmed to translate any order requests received from server 110 into the programming language, syntax, and format expected by the new POS and vice versa. It should be understood that, while the ensuing explanation describes communications between server 110 and POS 106, the communications are accomplished via the POS bridge.

Server 110 stores information about the products offered by restaurant 104 in the server's memory. In one embodiment, this is accomplished when server 110 transmits a request to the POS bridge for information about the products offered by restaurant 104. As a result, the POS bridge requests the product information from POS 106 via the POS's API. The API returns data for each product offered by restaurant 104, which, in one embodiment, may take the form of an XML file. It should be understood, however, that while the format, syntax, arrangement, and elements of the XML file may vary depending on POS 106 and the corresponding API, it should be understood that the API defines these characteristics in a manner that allows the POS bridge to be programmed to translate the file into the programming language, syntax, and format expected by server 110 to receive and store the information appropriately. It should also be understood that while the information transmitted by the API may take other forms, such as a database recordset, the POS bridge is programmed to convert the information into data understood by server 110. The POS bridge transmits the converted information to server 110, which then parses and stores the data contained in the file in a profile for restaurant 104 located in the server's memory.

It should also be understood that server 110 may be configured to provide an administration, back office, or backend website that allows a user (e.g., a restaurant manager) tasked with managing the product information for restaurant 104 to access, change, and update the information stored on server 110. In a preferred embodiment, the user gains access to the backend website by supplying a username and password to server 110. It should be understood that the information about the products offered by an establishment may be different for each restaurant and may include the name of an item, its price, time during which the item is available, amount of time required to prepare the item, sides or options available for the item, etc. The user may also structure the product information as desired so that it may include sub categories, such as breakfast, lunch, and dinner, or other categories, such as appetizers, entrees, beverages, etc. The user may also associate each item with item modifiers, such as add-on items which may modify the price and make-up of the item (e.g., whether cheese should be added to a sandwich). Each item may also be associated with a photograph or image representative of the item. An item may be associated with a qualifier, such as whether it's a "sale" item, and a corresponding discounted price. It should be understood that the configuration and operation of such a backend website may vary depending on the information required by POS 106, its API, server 110, the POS bridge, and the mobile application described below, without departing from the scope of the present invention. In a preferred embodiment, for example, the backend website prevents the user from altering the information about the products offered by restaurant 104 that server 110 transmits to the POS bride to effect an order. Such backend websites that allow users to modify the information about products offered by a retail establishment should be understood by those skilled in the art and are therefore not described in further detail.

In the example illustrated, geographical region 102 comprises a number of roads 118, including a highway 120 having an off ramp 122 and an on ramp 124. Region 102 may comprise other structures, as should be understood in the art, including additional retail establishments 126 and 128 and residential homes 130 and 132.

Prior to the use of system 100 by a customer, the user responsible for the data associated with restaurant 104 uses the backend website to provide server 110 with information about restaurant 104, including its location. That is, the user accesses the backend website provided by server 110 by logging into the website as described above using a suitable internet browser and provides the street address or GPS coordinates of the restaurant to the server. In the event the user provides the street address of restaurant 104 to server 110 via the backend website, the server retrieves the GPS coordinates associated with the street address using the maps service API, as should be understood in the art. The user may provide additional information about restaurant 104, including an indication that the restaurant is a quick serve restaurant ("QSR"), along with an identification of times during which the restaurant is busiest. Server 110 uses the information about restaurant 104 stored in its memory in the manner described below.

At this point, the user also defines a geofenced area to be associated with the restaurant. Server 110 uses the geofenced area to determine when to release an order placed by a customer in the manner described below with respect to FIG. 2. A geofence may be referred to as a virtual perimeter for a real world geographic area, such as area 102. For example, FIG. 1 includes two geofenced areas: a circular geographic region denoted by dashed line 134 and a polygonal geographic region denoted by dotted line 136.

The user may define the geofenced area for restaurant 104 using the backend website in several ways. In one embodiment, for instance, the user provides server 110 with a value to be used as a radius to define a circular region, the center of which is restaurant 104. For example, the user provides a value of one mile indicating that the geofenced area should include the entire geographic region located within one mile of restaurant 104. Server 110 associates the value of the radius with restaurant 104 and stores the information in memory.

In another embodiment, server 110 presents a map associated with restaurant 104 via the API of the maps service. That is, server 110 requests a map from the maps service by transmitting the location of restaurant 104 to the maps service via its API to be used as the center of the map. The data returned by the maps service is transmitted to the user's internet browser and presented to the user as a map, as should be understood by those skilled in the art. In one embodiment, the map service transmits a portion of its API that includes a radius tool to the user's internet browser based on the instructions transmitted to the maps service by server 110. The user utilizes the radius tool provided to create a circular geographic region surrounding restaurant 104, such as area 134, on the map presented by the internet browser, in a manner that should be understood by those skilled in the art. When the user activates a button associated with the map to save the geographic region, server 110 determines the radius of the circular geographic region, associates the value of the radius with restaurant 104, and stores the information in memory.

In another embodiment, the maps service transmits a portion of its API that includes a polygon tool to the user's internet browser. The user utilizes the polygon tool provided to create a polygonal geographic region surrounding restaurant 104 on the map, such as area 136, in a manner that should be understood by those skilled in the art. When the user activates the button associated with the map to save the geographic region in this embodiment, the maps service transmits to server 110 the GPS coordinates for each vertex of the polygon surrounding the restaurant as defined by the user. The server associates the vertexes with restaurant 104 and stores the information in memory.

Figure 2:
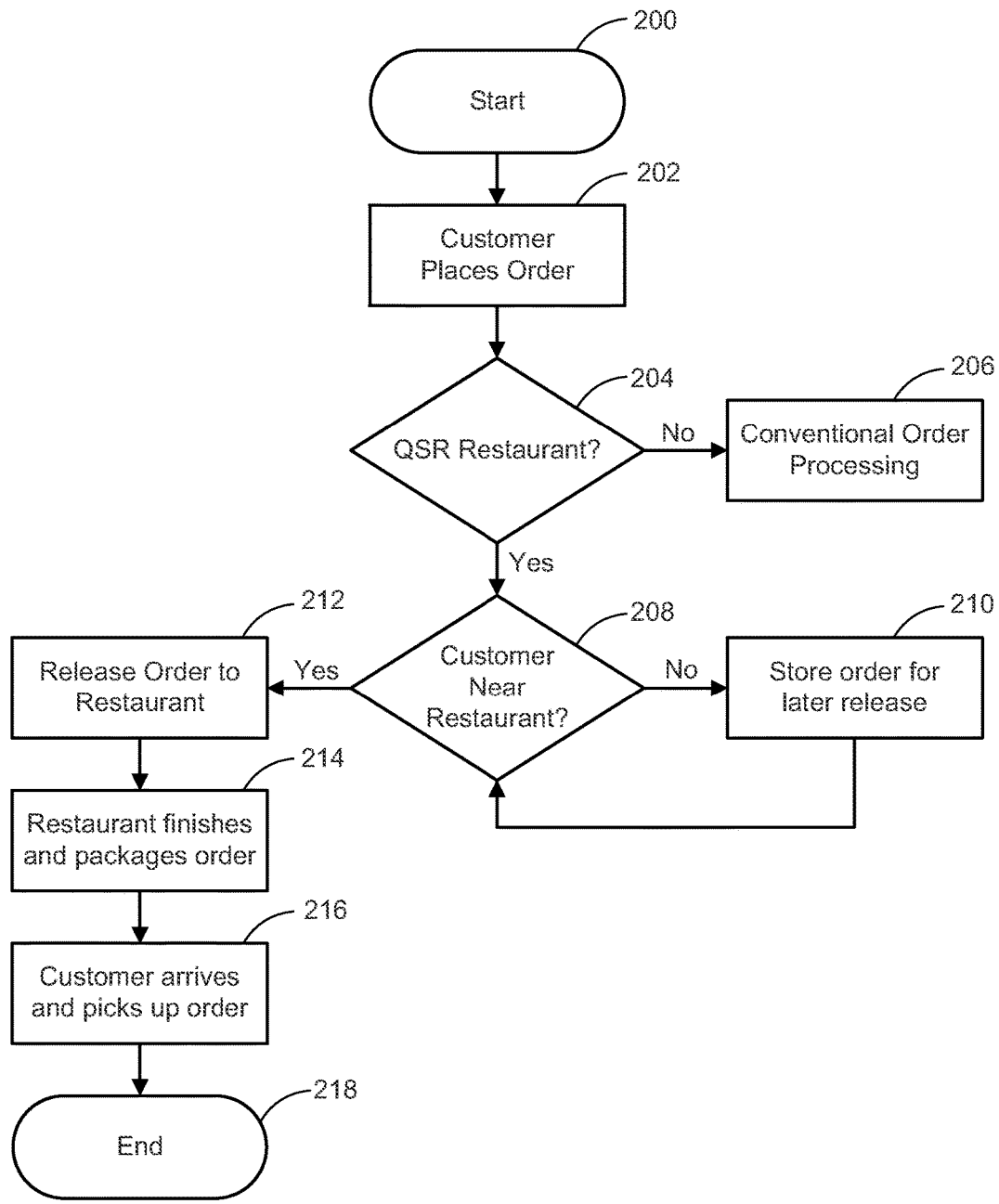
FIG. 2 is a flowchart illustrating an exemplary process for fulfilling an order using the mobile restaurant ordering system of FIG. 1.

FIG. 2 illustrates an exemplary process for carrying out an order using mobile restaurant ordering system 100 of FIG. 1. Accordingly, the ensuing explanation of FIG. 2 is made with reference to system 100 and geographic region 102 of FIG. 1. At step 200, a user of mobile device 114 downloads and installs a mobile application on the mobile device, as described above, that includes the information about the products offered by restaurant 104. The user initiates the mobile application by selecting indicia associated with the application that is presented by mobile device 114 after installation. Once initiated, the mobile application presents a graphical user interface ("GUI") via mobile device 114 to the user.

In this embodiment, the mobile application presents the user with the products offered by restaurant 104 to be selected and purchased by the user via the GUI. The mobile application either includes information corresponding to the products when installed or is configured to download the information from server 110 when initiated and present the information via the GUI, as should be understood in the art. The information may include a menu having its own predefined structure. The menu may include sub menus, such as breakfast, lunch, and dinner, as well as menu groups, such as appetizers, entrees, beverages, etc., corresponding to the categories and other information provided by the user via the backend website as described above. Each item on the menu may include its own predefined structure depending on the particular restaurant and may include details such as a description, price, preparation time, available sides or combinations, etc. Mobile applications that provide menus to customers and allow the customers to purchase selected items should be understood to those skilled in the art and are therefore not described in more detail.

At step 202, a customer places an order to be fulfilled by restaurant 104 using the mobile application. For instance, a customer located within residential home 130 places the order using mobile device 114. Mobile device 114 transmits the order to server 110 via cellular tower 112 and WAN 108. In one embodiment, mobile device 114 begins transmitting GPS data to server 110 either with the order or shortly thereafter. The mobile application then causes mobile device 114 to transmit GPS data that includes the mobile device's location to server 110 periodically. Server 110 receives and processes the data representative of the GPS location in the manner described in more detail below. In one embodiment, the customer also uses the mobile application to pay for the order via mobile device 114 at step 202. While the ability to pay for the order is preferably included in the same mobile application used to place the order, it should be understood that a separate application may be used instead without departing from the scope of the present invention. Mobile and web applications configured to request and receive payment information and to effect payment for items based on the received information should be understood by those skilled in the art and are therefore not described in more detail herein.

As should also be understood in the art, the transmission path of data from mobile device 114 to server 110 may include devices other than cellular tower 112, such as additional cellular towers, satellites, routers, gateways, etc. For instance, mobile device 114 may be connected to a local area network ("LAN") located within residential home 130 via wireless fidelity ("Wi-Fi") or any other suitable technology connecting the mobile device to the LAN, including Bluetooth or WiMAX. The LAN is operatively connected to WAN 108 and thereby transmits the data from mobile device 114 to server 110. In this manner, data transmitted from mobile device 114 is transmitted to server 110 via an alternate path than the one described above bypassing cellular tower 112 and other components maintained by the cellular carrier to which the mobile device is associated.

At step 204, server 110 receives the order and, in one embodiment, determines whether the restaurant to which the order is directed—restaurant 104—is a quick serve restaurant ("QSR") as identified in the profile associated with the restaurant stored in the server's memory. If not, processing proceeds to step 206, where the order is handled in a conventional manner. This may include transmitting the order to POS 106 to be treated as a conventional order placed by a customer at restaurant 104 via a cashier, kiosk, telephone, facsimile, email, or any other means accepted by the restaurant. Such conventional processing means should be understood by those skilled in the art and are, therefore, not described in more detail.

If server 110 determines at step 204 that restaurant 104 is a QSR, process flow proceeds to step 208. At this step, server 110 determines whether the customer placing the order is located near the restaurant; that is, whether mobile device 114 is within the geofenced area associated with restaurant 104, such as area 134. Server 110 makes this determination based on the GPS data transmitted by mobile device 114 to the server. The manner by which the GPS data is processed by server 110 at step 208 to determine whether mobile device 114, and thus the customer, is located within the geofenced area is described in more detail below.

If server 110 determines that mobile device 114 is not within the geofenced area associated with restaurant 104, process flow proceeds to step 210. At this step, server 110 stores the order and process flow returns to step 208 and repeats. If server 110 determines that mobile device 114 is within the geofenced area, process flow proceeds from step 208 to step 212. It should be understood that the mobile application continues to instruct mobile device 114 to periodically transmit GPS data representative of the mobile device's location during this time. Server 110 uses the GPS data received at step 208 to determine whether the customer has entered the geofenced area in the manner described below.

Continuing the example above, for instance, after placing the order, the user of mobile device 114a begins traveling toward restaurant 104 to retrieve the order. This may be accomplished by the use of a vehicle to navigate roads 118 connected to the restaurant (as denoted at 114b). Mobile device 114 continues to transmit GPS data to server 110 during this time. After the customer enters area 134, server 110 determines that mobile device 114 is within the geofenced area based on the GPS data received from the mobile device (as denoted at 114c) and proceeds to step 212. By way of another example, an order placed by a user of mobile device 116 is automatically released at steps 208 and 212 because the user is already within area 134 as determined by server 110 based on GPS data transmitted by mobile device 116 to the server.

In one embodiment, server 110 uses a distance formula to determine whether mobile device 114 has entered a circular geofenced area, such as area 134. The distance formula in this example is $d=\sqrt{(x_2-x_1)^2+(y_2-y_1)^2}$, where d is the distance between restaurant 104 and mobile device 114, as determined based on the GPS data transmitted by the mobile device to server 110. That is, the set of coordinates of the GPS data from mobile device 114 corresponds to coordinates $(x_2, y_2)$, while the GPS coordinates associated with restaurant 104 corresponds to coordinates $(x_1, y_1)$. If d is less than the value of the radius associated with restaurant 104 as stored by server 110, then mobile device 114 is within geofenced area 134, and the order is released to restaurant 104 (i.e., process flow proceeds from step 208 to step 212).

In the event the geofenced region has been manually defined as a polygonal area, such as geofenced area 136 illustrated in FIG. 1, a point-in-polygon ("PIP") or Ray casting algorithm may be used to determine whether mobile device 114 is within the area. The following JavaScript source code is an example of a suitable PIP algorithm that allows server 110 to make this determination:

```
bool WithinPolygon(Polygon polygon, Point point) {
    int j = polygon.Verticies.Length - 1;
    var oddNodes = false;
    for (var i = 0; i < polygon.Verticies.Length; i++)
    {
        if (polygon.Verticies[i].Y < point.Y && polygon.Verticies[j].Y >=
            point.Y ||
            polygon.Verticies[j].Y < point.Y &&
            polygon.Verticies[i].Y >= point.Y)
        {
            if (polygon.Verticies[i].X +
                (point.Y - polygon.Verticies[i].Y)/(polygon.Verticies[j].Y -
                    polygon.Verticies[i].Y) * (polygon.Verticies[j].X -
                    polygon.Verticies[i].X) < point.X)
            {
                oddNodes = !oddNodes;
            }
        }
        j = i;
    }
    return oddNodes;
}
```

In one embodiment, if server 110 is unable to locate mobile device 114, such as, for instance, if the mobile device loses connectivity to WAN 108 or for any other reason that prevents the mobile device from transmitting GPS data or the server from receiving it, for longer than a predetermined amount, process flow proceeds from step 208 to 212. That is, if server 110 has not received GPS data from mobile device 114 for longer than a predefined amount of time, such as 300 seconds (or 5 minutes), the server releases the order to POS 106.

At step 212, server 110 transmits the customer's order to POS 106. At this point, server 110 or POS 106 may transmit a notification to mobile device 114 that the order has been released to restaurant 104 and/or that the order is being prepared. At step 214, restaurant 104 processes the order and finishes packaging or otherwise preparing the items ordered by the customer. At step 216, the customer arrives and retrieves the completed order. In an embodiment where the customer has not previously paid for the order, the customer may pay for the order at step 216. This may be accomplished via interaction with a cashier or kiosk located in restaurant 104 or any other suitable method understood by those skilled in the art. The process then terminates at step 218, which may include a number of ancillary tasks. For instance, system 100 may transmit a survey or feedback request to mobile device 114, as described in more detail below.

It should be understood that server 110 may be configured to process orders for multiple restaurants located both within and outside of geographic region 102 in a manner similar to that described above. That is, server 110 may be configured to process orders received from mobile devices in the manner described above for restaurants other than restaurant 104 located within geographic region 102 or within a different geographic region. It should also be understood that server 110 and POS 106 may be combined into a single device in a scenario where the server is configured to process orders for restaurant 104 only. That is, POS 106 may perform the functions described above with respect to both the POS and server 110, including being configured to handle the data transmitted by mobile devices 114 and 116.

In an embodiment where the geofenced area is defined by a radius, system 100 may use an adaptive algorithm to modify the geofenced area based on one or more factors. The adaptive algorithm may modify the geofenced area when a user places an order or before determining whether the user is within the geofenced area. For example, the algorithm may be executed to modify the geofenced area when the user places the order at step 202 or each time server 110 processes GPS data received from mobile device 114 to determine whether the user has entered the geofenced area at step 208. In one embodiment, the algorithm varies depending on the time of day when the algorithm is executed. In this example, the algorithm defines the radius of the geofenced area to be equal to $$u + \left(\left(v * t + \frac{a}{2}\right) * c\right)$$

if the time the algorithm is executed is within a set P and equal to $$u + \frac{a}{2}$$

if the time is not within set P. Set P may include a set of peak time periods when restaurant 104 is at its busiest, such as, for example, rush hour. u is the base radius defined by the user, as described above. v is a velocity vector associated with mobile device 114, and c is an empirical evidence coefficient, both of which are explained in more detail below.

Order prep time t is the time it takes for an order to be completed once released to restaurant 104. Order prep time t is typically expressed in minutes and is defined by restaurant 104. The user responsible for the data associated with restaurant 104 stored by server 110 as described above may provide the order prep time to the server. In this embodiment, prep time t is an average time defined by the restaurant required to prepare an order. However, in another embodiment, prep time t may be specific to each item. In such an embodiment, server 110 calculates a radius for the geofenced area based on each item included in the order. Server 110 then defines the geofenced area using the radius with the greatest value.

a is a positional accuracy value that is transmitted by mobile device 114 to server 110 when the mobile device is configured to use aGPS, as should be understood in the art. In this embodiment, a is divided by two in order to account for the discrepancy in the accuracy of the aGPS data. For instance, the value of a represents the distance mobile device 114 could actually be from the aGPS coordinates transmitted by the mobile device. Since mobile device 114 could be either closer to or farther away from restaurant 104 as measured by the value of a when the aGPS data is transmitted to server 110, the value is halved in this embodiment to account for both scenarios.

Velocity vector v is the rate of change of displacement with respect to the destination, or, in this case, restaurant 104. Server 110 determines velocity vector v by processing multiple GPS coordinates received from mobile device 114. Server 110 calculates the mobile device's average speed and direction based on the GPS data transmitted to the server by the mobile device. In this embodiment, server 110 calculates velocity vector v using the equation $$\frac{\Delta x}{\Delta t} = \frac{x_f - x_i}{t_f - t_i} = \frac{\text{displacement}}{\text{elapsed time}},$$

where $\Delta x$ represents the change in successive GPS coordinates of mobile device 114 and $\Delta t$ represents the change in time associated with receipt of each set of GPS coordinates.

Empirical evidence coefficient c is a factor applied to the equation in order to increase the algorithm's accuracy. By default, empirical evidence coefficient c is one (1) but may be altered each time an item is retrieved by a customer (at step 216 of FIG. 2) using system 100. For instance, if the food is prepared prior to the customer's arrival by a certain amount of time, empirical evidence coefficient c may be decreased. If the customer arrives before the item is prepared so that the customer must wait for the item, empirical evidence coefficient c may be increased. In one embodiment, empirical evidence coefficient c may be increased or decreased in one or more predetermined increments, such as by five percent (5%) increments. In one embodiment, server 110 increases or decreases empirical evidence coefficient c based on the responses to a customer survey provided to a customer after receiving an order placed via system 100, as described below. This allows the algorithm to modify the geofenced area based on other factors, such as new or untrained employees or typical traffic patterns of the associated geographic area, that affect the actual time required to prepare an item offered by the restaurant. Empirical evidence coefficient c may be applied to the entire menu offered by restaurant 104 or may be defined with respect to each item offered. For instance, server 110 calculates a radius for the geofenced area using the adaptive algorithm described above based on the empirical evidence coefficient for each item included in the order. Server 110 then defines the geofenced area using the radius with the greatest value.

In one embodiment, server 110 transmits a survey or feedback request to mobile device 114, as noted above with respect to step 218 of FIG. 2. The survey includes questions directed to the customer, such as whether the order was ready when the customer arrived or whether the customer had to wait for the order to be prepared or completed. Depending on the customer's responses to the survey, server 110 may increase or decrease empirical evidence coefficient c. Server 110 may be configured to transmit these surveys only during a predefined timeframe after restaurant 104 has been configured to use system 100 where the predefined timeframe is sufficient to establish empirical evidence coefficient c with certainty. In one embodiment, the survey is transmitted to mobile device 114 as a text (or "SMS") message, an email, or any other type of notification accepted by the mobile device. The information received in response to the survey may be aggregated over time and used in conjunction with the GPS data transmitted by each mobile device to define an accurate geofenced area. For example, the user responsible for the information corresponding to restaurant 104 stored by server 110 can manually aggregate the information over time in order to determine an accurate empirical evidence coefficient for the restaurant, which may be provided to the server before executing the adaptive algorithm.

In one embodiment, if any of the variables of the adaptive algorithm is missing or unknown, it is ignored when the algorithm is executed to modify the geofenced area. In another embodiment, the adaptive algorithm may take into account and utilize only a subset of the variables described above. For instance, the adaptive algorithm may only apply empirical evidence coefficient c to base radius u in order to modify the circular geofenced area associated with the QSR. In another embodiment, for example, server 110 may be configured to retain the order while the current time is in set P and mobile device 114 is not inside geofenced area 134.

Once mobile device 114 enters geofenced area 134, server 110 is notified and the order is released based on velocity vector v and the location of restaurant 104, in one embodiment. As should be appreciated by those skilled in the art, server 110 requires more than one set of GPS coordinates from mobile device 114 to determine velocity vector v in order to modify the geofenced area. In such an embodiment, if an insufficient number of GPS coordinates are received from mobile device 114 within a timeout period, server 110 automatically releases the order. In another embodiment, if server 110 does not receive GPS data from mobile device 114 for a predetermined amount of time, the order is automatically released.

In another embodiment, server 110 is configured to transmit a notification to restaurant 104 when the server determines at step 208 that the user has entered the goefenced area. Server 110 may transmit the notification to POS 106 via the POS bridge and the POS's API or to another computing device, such as a kiosk, located within the restaurant and operatively connected to the server via WAN 108. Server 110 may transmit the notification via any suitable technology understood in the art, such as a text message or SMS, email, and facsimile. As a result, server 110 informs a computing device or personnel within restaurant 104 that the user has entered the goefenced area and/or will be arriving at the restaurant.

In another embodiment, server 110 is configured to allow the user responsible for the information stored by the server that is associated with restaurant 104 to define multiple geofenced areas for the restaurant. Referring again to FIG. 1, for instance, the user defines another circular geofenced area 140 using the backend website provided by server 110 in a manner similar to that described above with respect to geofenced area 134. That is, the user utilizes the map and radius tool transmitted to the user's internet browser from the maps service to select a location as the center and to define a radius of the second geofenced location. Server 110 stores the association of the second geofenced area with restaurant 104 in memory. Server 110 may accomplish this by storing an indication that restaurant 104 is associated with multiple geofenced areas, the center of the additional geofenced area, and the value of the radius in the restaurant's profile in the server's memory. In this example, geofenced area 140 covers a geographic region through which tracks 138 pass. It should be understood that tracks 138 are configured to support a train, light rail, or other fixed-path transportation system.

Referring additionally to FIG. 2, process flow proceeds to step 208 in the manner described above, which includes the receipt of GPS data at server 110 from the user's mobile device. At step 208, server 110 determines whether the user is within geofenced area 134 in the manner described above. If not, server 110 determines whether restaurant 104 is associated with any other geofenced areas by analyzing the restaurant's profile in memory. In this example, restaurant 104 is also associated with geofenced area 140. At step 208, server 110 determines whether the GPS data received from the mobile device indicates that the user is within geofenced area 140. This is accomplished in any manner similar to those described above with respect to geofenced area 134. For instance, server 110 uses the distance formula set forth above to calculate the distance between the user and the center of geofenced area 140 and then compares the radius of the area to the distance to determine if the user has entered the area. If so, process flow proceeds to step 212 and continues in the manner described above. If not, process flow proceeds to step 210, then back to step 208, and repeats as described above.

It should be understood that such an embodiment allows multiple geofenced areas to be associated with a retail establishment in order to account for different traffic patterns or modes of transportation. For instance, a user riding on a light rail system supported by tracks 138 that passes through geofenced area 140 is likely to arrive at restaurant 104 sooner than the user of mobile device 114 entering geofenced area 134 via roads 118 (denoted by the movement of mobile device 114b to mobile device 114c). This may be exacerbated if the user of mobile device 114 experiences traffic conditions on roads 118, to which the user of the light rail system is not subject. Accordingly, server 110 allows the configuration of multiple geofenced areas and the association of the multiple areas to a retail establishment in this embodiment to account for peculiarities of a geographic area, such as region 102.

It should be understood that the above description provides a retail establishment with the ability to begin preparing or to finalize an order received from a customer using a mobile device when the customer enters a predefined geographic area as determined by GPS data transmitted by the mobile device. While the retail establishment in the examples provided above is a restaurant, those skilled in the art should appreciate that the systems and methods described above are applicable to other types of retail establishments as well. Referring again to FIG. 1, for example, retail establishment 104 may be a general retailer that makes its for-sale inventory list available via a mobile application, similar to the one described above. A customer associated with mobile device 114 makes a selection of a desired item via the GUI of the mobile application executing on the mobile device. Mobile device 114 transmits the selection as an order to server 110 that is associated with general retailer 104. The customer then travels towards the general retailer's location, while the mobile device periodically transmits GPS data to server 110. When server 110 determines the customer has entered the geofenced area associated with the general retailer's location based on the GPS data received by the server in a manner similar to that described above, the server transmits the order to POS 106 of general retailer 104. The general retailer then prepares the order (e.g., retrieves the selected items from store shelves or inventory and packages the selected items for delivery to the customer) in expectation of the customer's arrival. Process flow then otherwise proceeds in the manner described above.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for processing an order for a retail establishment, including preparing food for a customer, wherein a server is in communication with a processing device at the retail establishment and the server provides an application to a mobile device that includes a list of food items available for purchase from the retail establishment, the method comprising the steps of:
- receiving by the server a selection of at least one food item for purchase from the retail establishment from the mobile device;
- subsequent to receiving the selection of the at least one food item from the mobile device, receiving by the server a plurality of data sets comprised of location data from the mobile device;
- determining by the server whether the mobile device is within a geographic region comprising a circular outer boundary of a computed radius around a physical location of the retail establishment based on the received plurality of data sets, the computed radius calculated from a base radius defined by a user of the processing device at the retail establishment and an empirical evidence factor associated with a performance of the retail establishment on previous orders;
- communicating from the server to the processing device the selection of the at least one food item for purchase from the retail establishment, wherein the selection of the at least one food item for purchase from the retail establishment is not communicated to the processing device until the server has determined that the mobile device is within the geographic region; and
- preparing the at least one food item for presentation to the customer at the retail establishment based upon determination from the determining step that the mobile device is within the geographic region.

2. The method of claim 1 wherein the step of determining whether the mobile device is within the geographic region comprises:
- calculating by the server a distance between the location of the mobile device and the physical location of the retail establishment; and
- comparing by the server the distance between the location of the mobile device and the physical location of the retail establishment to the computed radius.

3. The method of claim 2 wherein the step of preparing the at least one food item for presentation at the retail establishment when the mobile device is within the geographic region comprises determining if the distance between the location of the mobile device and the physical location of the retail establishment is less than the computed radius.

4. The method of claim 1 wherein the location data received from the mobile device comprises GPS coordinates associated with the mobile device.

5. The method of claim 1 further comprising receiving payment information from the mobile device sufficient to effect payment for the at least one food item.

6. The method of claim 5 further comprising transmitting the payment information to a point-of-sale system associated with the retail establishment configured to process the payment information to effect payment for the at least one food item.

7. The method of claim 1 wherein the geographic region is a first geographic region, the method further comprising:
- establishing a second geographic region associated with the retail establishment;
- determining whether the mobile device is within the second geographic region based on the data received at the server representative of the location of the mobile device; and
- directing the retail establishment to prepare the selection when the mobile device is within the second geographic region.

8. The method of claim 7 wherein the step of determining whether the mobile device is within the second geographic region is performed if it is determined that the mobile device is not within the first geographic region.

9. The method of claim 1 further comprising transmitting a notification to the retail establishment that a customer associated with the mobile device will be arriving at the retail establishment shortly when the mobile device enters the geographic region.

10. The method of claim 1, wherein the computed radius is further calculated from a preparation time for the at least one food item.

11. The method of claim 1, wherein the empirical evidence factor is based on survey results from surveys presented to customers of the retail establishment subsequent to the previous orders.

12. The method of claim 1, wherein the computed radius is further calculated from a rate of change in distance of the mobile device from the physical location of the retail establishment, the rate of change in distance determined by the server based upon the plurality of data sets comprised of location data received from the mobile device.

13. A system for processing an order for a purchase, the system comprising:
- a mobile device enabling a user to make a selection of at least one food item for purchase from a retail establishment; and
- a server communicatively connected to the mobile device, the server configured to
  - receive the selection of the at least one item for purchase from the mobile device,
  - receive a plurality of data sets comprised of location data from the mobile device,
  - determine whether the mobile device is within a geographic region associated with the retail establishment based on the received plurality of data sets, the geographic region comprising a circular outer boundary of a computed radius around a physical location of the retail establishment, the computed radius calculated from a base radius defined for the retail establishment and an empirical evidence factor associated with a performance of the retail establishment on previous purchases of food items,
  - upon determining that the mobile device is within the geographic region associated with the retail establishment, communicate with a processing device at the retail establishment the selection of the at least one food item for purchase, and
  - instruct through the processing device at the retail establishment to prepare the at least one food item for presentation to the user.

14. The system of claim 13, wherein the server is further configured to, upon the server determining that the mobile device is not within the geographic region, determine at least one more time whether or not the mobile device is within the geographic region.

15. The system of claim 14, wherein the server is further configured to repeat the step of determining whether the mobile device is within the geographic region until occurrence of an event selected from a determination that the mobile device is within the geographic region and an elapsing after a predetermined amount of time.

16. The system of claim 13, wherein the server is further configured to:
- receive a second selection of at least one food item for purchase at a second retail establishment from a second mobile device;

determine whether the second mobile device is within a second geographic region associated with the second retail establishment; and upon determining whether that the second mobile device is within a second geographic region, instruct the second retail establishment to prepare the at least one item according to the second selection for presentation to a user of the second mobile device.

17. The system of claim 13, wherein the radius of the geographic region is computed using a formula:

$$u+((v*t+a/2)*c)$$

wherein u is the base radius, v is a velocity vector with respect to the physical location of the retail establishment associated with the mobile device, t is a time to complete the order, a is a positional accuracy value associated with the location data in the plurality of data sets received from the mobile device, and c is the empirical evidence factor.

18. The system of claim 13, wherein the empirical evidence factor is based on survey results from surveys presented to recipients of the previous purchases of food items of the retail establishment.

19. An ordering system comprising:

a processing device of a restaurant system; and a mobile device communicatively connected to a server, the mobile device comprising ordering means for prompting a user of the mobile device to select a restaurant and at least one food item to purchase from the restaurant and for placing an order, the order comprising the selected restaurant and the selected at least one food item to purchase; and the server communicatively connected to the processing device and communicatively connected to the mobile device, the server comprising:

selection means for receiving the order from the mobile device subsequent to the placing of the order by the ordering means of the mobile device;

geofence location means for determining whether the mobile device is within a geofence defined by a circular outer boundary of a computed radius around the restaurant based on a plurality of data sets comprised of location data received from the mobile device, the computed radius calculated from a base radius defined by a user of the processing device at the restaurant and an empirical evidence factor associated with a performance of the restaurant on previous orders; and holding means for holding the order from being communicated through to the processing device upon determining by the geofence location means that the mobile device is not within the geofence and for releasing the order to the processing device upon determining by the geofence location means that the mobile device is within the geofence based on the plurality of data sets comprised of location data received from the mobile device.

20. The ordering system of claim 19, wherein the geofence location means calculates the computed radius of the geofence using a formula:

$$u+((v*t+a/2)*c),$$

wherein u is the base radius, v is a velocity vector with respect to a physical location of the restaurant associated with the mobile device, t is a time to complete the order, a is a positional accuracy value associated with the location data in the plurality of data sets received from the mobile device, and c is the empirical evidence factor.

* * * * *